(12) United States Patent
Li et al.

(10) Patent No.: US 11,760,868 B2
(45) Date of Patent: Sep. 19, 2023

(54) PREPARATION METHOD FOR A FLAME RETARDANT POLYSTYRENE

(71) Applicant: Useon (Nanjing) Extrusion Machinery Co., Ltd., Nanjing (CN)

(72) Inventors: Shuzhao Li, Nanjing (CN); Zhiqiang Chen, Nanjing (CN)

(73) Assignee: Useon (Nanjing) Extrusion Machinery Co., Ltd., Nanjing (CN)

( * ) Notice: Subject to any disclaimer, the term of this patent is extended or adjusted under 35 U.S.C. 154(b) by 0 days.

(21) Appl. No.: 17/867,107

(22) Filed: Jul. 18, 2022

(65) Prior Publication Data

US 2023/0151199 A1  May 18, 2023

(30) Foreign Application Priority Data

Nov. 12, 2021 (CN) .......................... 202111335941.7

(51) Int. Cl.
*C08L 25/08* (2006.01)
*C08J 3/22* (2006.01)
*C08L 27/24* (2006.01)

(52) U.S. Cl.
CPC .................. *C08L 25/08* (2013.01); *C08J 3/22* (2013.01); *C08L 27/24* (2013.01); *C08J 2325/06* (2013.01); *C08J 2327/24* (2013.01); *C08L 2201/02* (2013.01)

(58) Field of Classification Search
CPC ...... C08L 25/08; C08L 27/24; C08L 2201/02; C08J 3/22; C08J 2325/06; C08J 2327/24
See application file for complete search history.

(56) References Cited

U.S. PATENT DOCUMENTS 4,032,509 A * 6/1977 Lee .......................... C08K 3/26
524/424

FOREIGN PATENT DOCUMENTS

CN         102181004 A         9/2011

* cited by examiner

*Primary Examiner* — Andrew J. Oyer
(74) *Attorney, Agent, or Firm* — COOPER LEGAL GROUP, LLC

(57) ABSTRACT

The present application relates to a field of a flame retardant polystyrene, and specifically discloses a preparation method for a flame retardant polystyrene. The preparation method for a flame retardant polystyrene includes the following steps: predissolving a brominated flame retardant containing a first active functional group in a reaction system of a styrene monomer to form a homogeneous solution; then, performing an end capping reaction by an olefin monomer containing a second active functional group to introduce a double bond at an end of the brominated flame retardant, so that it can be bonded to a polystyrene molecular chain by copolymerizing; performing a prepolymerization in a reactor to obtain a prepolymer; performing a post polymerization in the reactor or by extruding, to obtain a special material or a flame retardant masterbatch of the flame retardant polystyrene.

9 Claims, No Drawings

PREPARATION METHOD FOR A FLAME RETARDANT POLYSTYRENE

CROSS-REFERENCE TO RELATED APPLICATION

This application claims the priority to China patent application serial no. 202111335941.7, filed on Nov. 12, 2021. The entirety of China patent application serial no. 202111335941.7 is hereby incorporated by reference herein and made a part of this specification.

TECHNICAL FIELD

The present application relates to a field of flame retardant polystyrene, in particular, relates to a preparation method for a flame retardant polystyrene.

BACKGROUND ART

A polystyrene is a kind of polymer obtained by polymerization of a styrene monomer. The polystyrene is widely used in various fields due to its excellent corrosion resistance, coloring effect and electrical properties.

However, the polystyrene is easy to be burned, and there will be not only a large amount of smoke, but also melting and dripping in a combustion process, which lead to lager potential safety hazards. Therefore, a flame retardant modification to the polystyrene is conducive to expand application fields of polystyrene materials.

In related technologies, a flame retardant polystyrene is mainly prepared by melting and mixing various brominated flame retardants, other additives and the polystyrene. However, due to a poor compatibility between the brominated flame retardants and the polystyrene, a dispersion effect of the brominated flame retardants in the polystyrene matrix is poor, thereby the flame retardancy of the prepared polystyrene resin is poor.

SUMMARY

In order to improve the flame retardancy of a flame retardant polystyrene, the present application provides a preparation method for an efficient flame retardant polystyrene.

First, the present application provides a preparation method for the efficient flame retardant polystyrene by adopting the following technical solution:

a preparation method for the efficient flame retardant polystyrene, including the following steps:

Step 1: performing an end capping reaction by mixing a styrene monomer, a brominated flame retardant containing a first active functional group and an olefin monomer containing a second active functional group; and heating to 90° C.-140° C. under stirring, after the brominated flame retardant containing the first active functional group is dissolved, to obtain a mixture containing the brominated flame retardant introduced with a double bond at an end.

Step 2: performing a prepolymerization by adding an initiator to the mixture obtained in step 1 to obtain a prepolymer.

Step 3: performing a copolymerization of the prepolymer to obtain the efficient flame retardant polystyrene.

In the above technical solution, the brominated flame retardant containing the first active functional group has good flame retardancy, which can be evenly dispersed in the styrene monomer after stirring and mixing, and reacts with the olefin monomer containing the second active functional group to obtain the brominated flame retardant introduced with a double bond at an end. During co-polymerizing of styrene, the brominated flame retardant introduced with a double bond at an end is boned to a polystyrene molecular chain by copolymerizing with the styrene, thereby the brominated flame retardant is more evenly dispersed in a reaction system, which is helpful to improve the flame retardancy of the prepared efficient flame retardant polystyrene. Moreover, the brominated flame retardants are bonded to the polystyrene molecular chain by copolymerizing with the styrene, which can effectively reduce an amount of the release of toxic compounds containing a bromine, thereby improving the safety and environmental performance of the obtained efficient flame retardant polystyrene.

In addition, the end capping reaction is performed at the temperature of 90° C.-140° C., which is helpful to improve the effect of introducing the double bond in the end capping reaction, and further to improve the flame retardancy of the efficient flame retardant polystyrene.

In some embodiments, a pair of the brominated flame retardant containing the first active functional group and the olefin monomer containing the second active functional group is at least one pair selected from the group consisting of the groups of tetrabromobisphenol A bis(2-hydroxyethyl) ether and maleic anhydride, 2,4,6-tribromoaniline and maleic anhydride, 2,4,6-tribromobenzoic acid and glycidyl methacrylate, and tetrabromophthalic anhydride and methacrylic acid.

In the above technical solution, among the above four pairs of corresponding brominated flame retardants containing the first active functional group and the olefin monomers containing the second active functional group, all the brominated flame retardants containing the first active functional group have good flame retardancy. Moreover, the end capping effect for reaction between the above brominated flame retardants containing the first active functional group and the corresponding olefin monomers containing the second active functional group is good, that is, the effect of introducing a double bond at an end of the brominated flame retardants containing the first active functional group is good. Thereby the co-polymerization effect of the brominated flame retardant containing the first active functional group and the styrene monomer is good, that is, the brominated flame retardants containing the first active functional group are more effectively bonded to the polystyrene molecular chain. Therefore, the obtained efficient flame retardant polystyrene has good flame retardancy. The amount of released toxic compounds containing the bromine is reduced, which helps to improve the safety and environmental performance of a product.

In some embodiments, a mass ratio of the brominated flame retardant containing the first active functional group to the olefin monomer containing the second active functional group is (2-4):1.

In the above technical solution, the mass ratio of the brominated flame retardant containing the first active functional group to the olefin monomer containing the second active functional group is controlled to be (2-4):1, which helps to improve a completion degree of the end capping reaction, that is, the completion degree of introducing the double bond at the end of the brominated flame retardant containing the first active functional group is higher. Thereby the effect of the brominated flame retardant containing the first active functional group bonding to the polystyrene molecular chain by copolymerizing with the styrene monomer is good, which helps to improve the flame retardancy of the efficient flame retardant polystyrene. In addition, a bonding degree of the brominated flame retardant containing the first active functional group is higher, which helps to effectively reduce an amount of free and dispersed toxic compounds containing the bromine in the system, thus the safety and environmental performance of the product is good.

In some embodiments, the end capping reaction in step 1 is performed for 0.5 h-1.5 h.

In the above technical solution, the end capping reaction for introducing the double bond to the brominated flame retardant containing the first active functional group cannot be fully completed under the condition that the reaction time is too short. However, the styrene monomer may undergo a thermal polymerization under the condition that the reaction time exceeds 2 hours. Therefore, by controlling a time for the end capping reaction to be 0.5 h-1.5 h, it can not only ensure a better completion degree of the end capping, but also reduce an occurrence of the thermal polymerization of styrene monomer.

In some embodiments, the initiator is a composite initiator including an azo initiator and a peroxide initiator in a mass ratio of 3:(5-8).

In the above technical solution, the azo initiator is a low temperature initiator, and the peroxide initiator is a medium-high temperature initiator. Therefore, combination of the azo initiator and the peroxide initiator to be used as the initiator for the prepolymerization of the system makes the polymerization effect of the system good in the whole heating process, and helps to improve a polymerization efficiency and a polymerization degree of the system, thereby a dispersion uniformity of the brominated flame retardant in the system can be improved, so that the flame retardancy of the obtained efficient flame retardant polystyrene is better. Additionally, when the mass ratio of the azo initiator to the peroxide initiator is 3:(5-8), the polymerization efficiency and the polymerization degree of the system are better, that is, the flame retardancy of the prepared efficient flame retardant polystyrene is better.

In some embodiments, the azo initiator is at least one selected from the group consisting of 2,2'-azobis(2-methylpropionitrile), dimethyl 2,2'-azobis(2-methylpropionate), and 2,2'-azobis-(2,4-dimethylvaleronitrile).

In some embodiments, the peroxide initiator is one or more selected from the group consisting of hydrogen peroxide, ammonium persulphate, potassium persulphate, benzoyl peroxide, tert-butyl peroxybenzoate, methyl ethyl ketone peroxide, dicumyl peroxide, lauroyl peroxide, di-tert-butyl peroxide, tert-butyl hydroperoxide, tert-butyl peroxy benzoate, and 1,4-bis (tert-butyl peroxy isopropyl) benzene.

In some embodiments, in step 1, adding a flame retardant synergist when mixing the styrene monomer, the brominated flame retardant and the olefin monomer containing the second active functional group, and the flame retardant synergist is diantimony trioxide.

In the above technical solution, the flame retardant synergist helps to improve the flame retardancy of the brominated flame retardant, and preferably is diantimony trioxide, which helps to improve the flame retardancy of the obtained polystyrene.

In some embodiments, the brominated flame retardant includes 0.1%-40% by mass based on a total mass of the styrene monomer, the brominated flame retardant containing the first active functional group, the olefin monomer containing the specific second active functional group and the flame retardant synergist.

In the above technical solution, the mass percentage of the brominated flame retardant containing the first active functional group is controlled to be 0.1%-40%, within which the dispersion uniformity of the brominated flame retardant in the styrene monomer is good, and the flame retardancy of the obtained efficient flame retardant polystyrene is good.

Second, the present application provides a flame retardant polystyrene plastic by adopting the following technical solutions:

a flame retardant polystyrene plastic prepared from the preparation method for the efficient flame retardant polystyrene described in the first aspect, in which the brominated flame retardant includes 1%-6% by mass based on a total mass of the styrene monomer, the brominated flame retardant containing the first active functional group, the olefin monomer containing the second active functional group and the flame retardant synergist; or the flame retardant polystyrene plastic is prepared by adding the efficient flame retardant polystyrene prepared from the preparation method for the efficient flame retardant polystyrene described above as a masterbatch to a general polystyrene or an impact resistant polystyrene, wherein the brominated flame retardant includes 6%-40% by mass based on a total mass of the styrene monomer, the brominated flame retardant containing the first active functional group, the olefin monomer containing the second active functional group and a flame retardant synergist.

In the above technical solution, the efficient flame retardant polystyrene containing 0.1%-6% of the brominated flame retardant has good flame retardancy, and a flame retardant extruded polystyrene foam or a flame retardant expanded polystyrene foam board product prepared with the above polystyrene as special material has good flame retardancy. In addition, the flame retardant product prepared by adding the efficient flame retardant polystyrene containing 6%-40% of the brominated flame retardant as the masterbatch to a general polystyrene or the impact resistant polystyrene also has excellent flame retardancy. Therefore, a appropriate application approach can be selected according to the content of the brominated flame retardant in the efficient flame retardant polystyrene, so that the flame retardancy of the obtained product is excellent.

In summary, the present application has the following technical effects:

1. In the present application, the brominated flame retardant containing the first active functional group is used as a flame retardant active substance, and the double bond is introduced at an end of the brominated flame retardant containing the first active functional group by the end capping reaction of the olefin monomer containing the second active functional group and the brominated flame retardant containing the first active functional group. The brominated flame retardant containing the first active functional group introduced with the double bond is bonded to the polystyrene molecular chain by copolymerizing with the styrene monomer. On the basis of uniform dispersion of the bromine flame retardant containing the first active functional group, the dispersion uniformity is further improved, which helps to improve the flame retardancy of products. Meanwhile, the brominated flame retardant containing the first active functional group is bonded to the polystyrene molecular chain, therefore the amount of the released toxic compounds containing a bromine can be reduced, and the safety and the environmental performance of the obtained product are better.

2. In the present application, the end capping reaction is performed for preferably 0.5 h-1.5 h. The end capping reaction for introducing the double bond to the brominated flame retardant containing the first active functional group cannot be fully completed under the condition that the reaction time is too short. However, the styrene monomer may undergo the thermal polymerization under the condition that the reaction time exceeds 2 hours. Therefore, by controlling the time for the end capping reaction to be 0.5 h-1.5 h, it can ensure the better completion degree of the end capping and reduce an occurrence of the thermal polymerization of styrene monomer.

3. In the present application, the flame retardant polystyrene with different content of the brominated flame retardants containing the first active functional group can be prepared, and the flame retardant polystyrene with low content can be used as the special material for preparing the flame retardant extruded polystyrene foam or the flame retardant expanded polystyrene foam board product. While the flame retardant polystyrene with high content can be added to the general polystyrene or the impact resistant polystyrene as the masterbatch for preparing flame retardant products. Therefore, it is widely used, and the flame retardancy of the obtained products is better.

DETAILED DESCRIPTION

An embodiment provides a preparation method for an efficient flame retardant polystyrene including the following steps:
- step 1 end capping: the end capping reaction was performed by stirring and mixing a styrene monomer, a brominated flame retardant containing a first active functional group and an olefin monomer containing a second active functional group; heating to 90° C.-140° C. under stirring after the brominated flame retardant containing the first active functional group was completely dissolved, to obtain a mixture containing the brominated flame retardant introduced with a double bond at an end;
- step 2 prepolymerization: the prepolymerization was performed by adding an initiator to the mixture obtained in the end capping reaction of step 1 to obtain a prepolymer;
- step 3 post polymerization: the prepolymer was transferred to a post polymerization instrument for a further copolymerization; after the copolymerization, a devolatilization and a granulation were performed to obtain the efficient flame retardant polystyrene.

The initiator used in the embodiment of the preparation method for the efficient flame retardant polystyrene preferably is a composite initiator including a peroxide initiator and an azo initiator. The peroxide initiator includes but is not limited to one or more of hydrogen peroxide, ammonium persulphate, potassium persulphate, benzoyl peroxide, tert-butyl peroxybenzoate, methyl ethyl ketone peroxide, dicumyl peroxide, lauroyl peroxide, di-tert-butyl peroxide, tert-butyl hydroperoxide, tert-butyl peroxy benzoate or 1,4-bis (tert-butyl peroxy isopropyl) benzene; the azo initiator includes but is not limited to at least one of 2,2'-azobis(2-methylpropionitrile), dimethyl 2,2'-azobis(2-methylpropionate) or 2,2'-azobis-(2,4-dimethylvaleronitrile).

The brominated flame retardant containing the first active functional group used in the embodiment of the preparation method for the efficient flame retardant polystyrene includes but is not limited to tetrabromobisphenol A, 2,4,6-tribromophenol, dibromophenyl glycidyl ether, etrabromobisphenol A bis(2-hydroxyethyl) ether, tetrabromo phthalic acid diethylene glycol propylene glycol diester/glycol, bromoneopentyl glycol, dibromoneopentyl glycol, tribromoneopentyl glycol, 3,3'-Oxybis[2,2-bis(bromomethyl)-1-propanol], 2,4,6-tribromoaniline, 3,4-dibromoaniline, 3-bromoaniline, 4-bromoaniline, 2-bromoaniline, 2,5-dibromoaniline, 2,6-dibromoaniline, 2,4-dibromoaniline, 3,5-dibromoaniline, 2-amino-5-bromobenzophenone, 3,5-dibromo-4-methylaniline, N,N-bis (2-hydroxypropyl)-2,4,6-tribromoaniline, 4-bromophthalic acid, tetrabromophthalic anhydride, 4-bromophthalic anhydride, 4-bromo-o-phenylacetic acid, 4-bromo-2,6-diethylaniline, 4-chloro-4,6-dibromoaniline, 4-bromo-2-methylaniline, 4-bromo-3-toluidine, 4-bromo-2,6-dimethylaniline, 3-bromobenzylamine, 2-bromobenzylamine, 4-bromobenzylamine, 2-(4-bromophenyl)ethylamine, 2-(3-bromophenyl)ethylamine, 2-(2-bromophenyl)ethylamine, 1-(4-bromophenyl)ethylamine, 2,6-dibromo-4-isopropylaniline, 2,4,6-tribromobenzoic acid, and 3-hydroxy-2,4,6-tribromobenzoic acid.

The olefin monomer containing the second active functional group used in the embodiment of the preparation method for the efficient flame retardant polystyrene includes but is not limited to acrylic acid, methacrylic acid, diacrylic acid, dimethylacrylic acid, vinyl phosphorous acid, 2-vinyl-4,6-diamino-1,3,5-triazine, 1,2-epoxy-4-vinylcyclohexane, tetrahydroxybutyl vinyl ether, ethylenesulfonic acid, butadiene monoxide, maleic anhydride, 2-(vinyloxy)ethanol, glycidyl acrylate, di(ethylene glycol) vinyl ether, methacrylic acid, fumaric acid, itaconic acid, undecylenic acid, sorbic acid, glycidyl methacrylate, acrylamide, methacrylamide, N-methylol acrylamide, hydroxyethyl acrylate, and hydroxypropyl acrylate.

A reaction time for the end capping reaction is preferably controlled at 0.5 h-1.5 h. The end capping reaction for introducing the double bond to the brominated flame retardant cannot be fully completed under the condition that the reaction time is too short; however, the styrene monomer may undergo a thermal polymerization under the condition that the reaction time exceeds 2 hours.

The reaction time for prepolymerization reaction is controlled between 15 minutes and 2 hours, and is preferably controlled between 30 minutes to 1 hour. A degree of the prepolymerization will not be enough under the condition that the prepolymerization time is too short; however, the degree of polymerization in the reaction system tends to be too high under the condition that the prepolymerization time is more than 2 hours, which makes the reaction out of control.

The post polymerization reaction in the embodiment can be performed in a reactor or in an extruder.

The extruder used for the post polymerization reaction may be an twin-screw extruder, a single-screw extruder, a two-stages extruder that has two single-screws in series, a two-stages extruder that has two twin-screws in series, a two-stages extruder that has one single-screw and one twin-screw in series. A diameter of the screw of the extruder (DD) is not limited, which can be determined according to an output and a torque.

For the extruder used for the post polymerization reaction, a residence time of the reaction system in a whole production line is preferably 20-90 minutes, preferably 30-60 minutes. A conversion rate of the monomers will be reduced under the condition that the residence time of materials in the extruder is too short. Theoretically, the longer the residence time, the higher the conversion rate of the polymerization reaction. However, too long residence time will result in too large equipment investment and reduced output.

The reaction temperature in the extruder mentioned in the embodiment is 20° C.-250° C., preferably is 30° C.-200° C., and further preferably is 70° C.-180° C. A rotational speed of the extruder is 1 rpm-1000 rpm, preferably is 10 rpm-500 rpm, and further preferably is 20 rpm-300 rpm. Too low rotational speed will reduce the output, while too high rotational speed will make the residence time of the materials in the extruder too short to complete the reaction.

The present embodiment will be further described in detail below in combination with examples.

Raw materials used in the examples of the present application are all commercially available.

The general polystyrene resin is available from Suzhou Xinlicheng Plastic Co., Ltd., with an article number of GPS-525N.

EXAMPLES

Examples 1-4 were same except that the selected brominated flame retardant containing the first active functional group and the olefin monomer containing the second active functional group were different.

170° C., and then the prepolymer obtained from step 2 was delivered to the post polymerization reactor by a material delivery pump for performing the polymerization reaction under stirring; after 8 hours of reaction, the post polymerization reactor was heated to 230° C., and then the materials were delivered to a devolatilization reactor in which a temperature was preset at 230° C. and a pressure was maintained at 3 kPa, where the unreacted styrene monomer was removed by flash evaporation; finally, a prepared copolymer was delivered to a twin screw extruder rotating outward for granulating, to obtain the efficient flame retardant polystyrene.

The brominated flame retardant containing the first active functional group was tetrabromobisphenol A bis(2-hydroxyethyl) ether.

The olefin monomer containing the second active functional group was maleic anhydride.

The flame retardant synergist was diantimony trioxide.

The initiator was a composite initiator including an azo initiator and a peroxide initiator in a mass ratio of 3:7. The azo initiator was 2,2'-azobis(2-methylpropionitrile), and the peroxide initiator was 1,4-bis(tert-butyl peroxy isopropyl) benzene.

TABLE 1 different types of materials in examples 1-4

| Materials | Examples | | | |
|---|---|---|---|---|
| | 1 | 2 | 3 | 4 |
| Brominated flame retardant containing the first active functional group | Tetrabromobis phenol A bis(2-hydroxyethyl) ether | 2,4,6-Tribromoaniline | 2,4,6-Tribromobenzoic acid | Tetrabromophthalic anhydride |
| Olefin monomer containing the second active functional group | Maleic anhydride | Maleic anhydride | Glycidyl methacrylate | Methacrylic acid |

Example 1 was described as follows.

An preparation method for an efficient flame retardant polystyrene included the following steps.

Step 1 end capping: under a protection of a inert gas, 9750 g styrene monomer, 150 g brominated flame retardant containing the first active functional group, 50 g flame retardant synergist and 50 g olefin monomer containing the second active functional group were added into a prepolymerization reactor, and stirred and mixed until the brominated flame retardant containing the first active functional group was completely dissolved; then the prepolymerization reactor was heated to 120° C. under stirring, and the end capping reaction was performed for 1 h to obtain a mixture containing the brominated flame retardant introduced with a double bonds introduced at an end.

Step 2 prepolymerization: after the end capping reaction was completed, 50 g initiator was added to the prepolymerization reactor, and then the prepolymerization reactor was heated to 150° C. under stirring to make the reaction system undergo the prepolymerization reaction for 1 hour, then the heating was stopped to obtain a prepolymer.

Step 3 post polymerization: a post polymerization reactor equipped with a reflux condenser at the top was preheated to Examples 5-8 were same as example 1 except that an extruder was used for the post polymerization reaction in step 3, and the brominated flame retardants containing the first active functional group and the olefin monomers containing the second active functional group used in examples 5-8 were different.

Example 5

Step 1 end capping and step 2 prepolymerization in example 5 were same as those in examples 1-4. Step 3 post polymerization specifically included: the prepolymer prepared in step 2 prepolymerization was delivered to the extruder, and the temperature was set to 180° C., and the residence time of the prepolymer in the extruder was 50 min. After the reaction was completed, a devolatilization was performed by a vacuum system provided at an end, then the efficient flame retardant polystyrene was obtained.

The extruder used was an extruder set, which is composed of two extruders in series, in which the screw diameter was 48 and the length/diameter ratio was 65.

TABLE 2 different types of materials in examples 5-8

| Materials | Examples | | | |
|---|---|---|---|---|
| | 5 | 6 | 7 | 8 |
| Brominated flame retardant containing the first active functional group | Tetrabromobis phenol A bis(2-hydroxyethyl) ether | 2,4,6-Tribromoaniline | 2,4,6-Tribromobenzoic acid | Tetrabromophthalic anhydride |
| Olefin monomer containing the second active functional group | Maleic anhydride | Maleic anhydride | Glycidyl methacrylate | Methacrylic acid |

In examples 9-12, a flame retardant polystyrene masterbatch with high content of the brominated flame retardant was prepared from selected different kinds of brominated flame retardants containing the first active functional group and olefin monomers containing the second active functional group, and then was blended with polystyrene resin to prepare a flame retardant polystyrene resin with low content of the brominated flame retardant.

Example 9

The mass of each material used in this example was 5000 g styrene monomer, 3000 g brominated flame retardant containing the first active functional group, 1000 g olefin monomer containing the second active functional group, 1000 g flame retardant synergist, and 30 g initiator. The types of each material in this example were same as those in example 1, and step 1 end capping, step 2 prepolymerization and step 3 post polymerization in this example were same as those in example 1. The flame retardant polystyrene resin masterbatch with high content of the brominated flame retardant was obtained.

The method for preparing the flame retardant polystyrene resin with low content of the brominated flame retardant is as follows. 500 g flame retardant polystyrene masterbatch with high content of the brominated flame retardant prepared in this example, 9500 g general polystyrene resin and 50 g antioxidant 1010 were premixed in a high speed mixer, and then were added to a twin-screw extruder with a diameter of 48 mm and a length/diameter ratio of 35 for extruding and granulating at 180° C., then the flame retardant polystyrene resin with low content of the brominated flame retardant was obtained.

Example 13

This example was same as example 1 except that the mass of each material was 9725 g styrene monomer, 150 g brominated flame retardant containing the first active functional group, 50 g flame retardant synergist, 75 g olefin monomer containing the second active functional group, and 50 g initiator. The preparation method for the flame retardant polystyrene resin in this example was same as that in example 1.

Example 14

This example was same as example 1 except that the mass of each material was 9762.5 g styrene monomer, 150 g brominated flame retardant containing the first active functional group, 50 g flame retardant synergist, 37.5 g olefin monomer containing the second active functional group, and 50 g initiator. The preparation method for the flame retardant polystyrene resin in this example was same as that in example 1.

Example 15

This example was same as example 1 except that the end capping reaction time was 0.5 h.

Example 16

This example was same as example 1 except that the end capping reaction time was 1.5 h.

TABLE 3 different types of materials in examples 9-12

| Materials | Examples | | | |
|---|---|---|---|---|
| | 9 | 10 | 11 | 12 |
| Brominated flame retardant containing the first active functional group | Tetrabromobis phenol A bis(2-hydroxyethyl) ether | 2,4,6-Tribromoaniline | 2,4,6-Tribromobenzoic acid | Tetrabromophthalic anhydride |
| Olefin monomer containing the second active functional group | Maleic anhydride | Maleic anhydride | Glycidyl methacrylate | Methacrylic acid |

Example 17

This example was same as example 1 except that the initiator was the composite initiator including the azo initiator and the peroxide initiator in a mass ratio of 3:5. The azo initiator was 2,2'-azobis(2-methylpropionitrile), and the peroxide initiator was 1,4-bis (tert-butyl peroxy isopropyl) benzene.

Example 18

This example was same as example 1 except that the initiator was the composite initiator composed of the azo initiator and the peroxide initiator according to the mass ratio of 3:8. The azo initiator was 2,2'-azobis(2-methylpropionitrile), and the peroxide initiator was 1,4-bis (tert-butyl peroxy isopropyl) benzene.

Example 19

This example was same as example 1 except that no flame retardant synergist was added.

Comparative Example

In comparative example 1, the brominated flame retardant containing the first active functional group and the olefin monomer containing the second active functional group used in example 1 were directly melt and blended with the general polystyrene in the extruder for granulation to prepare the flame retardant polystyrene.

Comparative Example 1

The specific method for preparing the flame retardant polystyrene in this comparative example was as follows. 150 g brominated flame retardant containing the first active functional group, 50 g olefin monomer containing the second active functional group, 50 g flame retardant synergist, 9750 g general polystyrene, and 50 g antioxidant 1010 were premixed in the high-speed mixer, and then were added to a twin-screw extruder with a diameter of 48 mm and a length/diameter ratio of 35 for extruding and granulating at 180° C. to prepare the flame retardant polystyrene; the types of the materials in this comparative example were same as those in example 1.

In comparative example 2, the brominated flame retardant containing the first active functional group and the olefin monomer containing the second active functional group used in example 1 were firstly blended with the general polystyrene to prepare masterbatch with high content of the brominated flame retardant, and then were blended with the general polystyrene to prepare the flame retardant polystyrene with low content of the brominated flame retardant.

Comparative Example 2

The specific method for preparing the flame retardant polystyrene in this comparative example was as follows. 5000 g general polystyrene powder, 3000 g brominated flame retardant containing the first active functional group, 1000 g olefin monomer containing the second active functional group, 1000 g flame retardant synergist, and 30 g antioxidant 1010 were premixed in a high speed mixer, and then were added to a twin-screw extruder with a diameter of 48 mm and a length/diameter ratio of 35 for extruding and granulating at 180° C. to prepare the flame retardant polystyrene masterbatch with high content of the brominated flame retardant.

Then, 500 g flame retardant polystyrene masterbatch with high content of the brominated flame retardant prepared in this comparative example, 9500 g general polystyrene resin, and 50 g antioxidant 1010 were premixed in a high speed mixer, and then were added to a twin-screw extruder with a diameter of 48 mm and a length/diameter ratio of 35 for extruding and granulating at 180° C. to prepare the flame retardant polystyrene with low content of the brominated flame retardant; the types of the materials in this comparative example were same as those in example 1.

Comparative Example 3

This comparative example 3 was same as example 1 except that no olefin monomer containing the second active functional group was added, and the balance was styrene monomer.

Comparative Example 4

This comparative example 4 was same as example 1 except that the end capping reaction time is 2.5 h.

Comparative Example 5

This comparative example 5 was same as example 1 except that the end capping reaction time is 0.2 h.

Performance Test Experiment

Test/Experiment Method

Oxygen index: the samples prepared in examples 1-19 and comparative examples 1-5 were tested according to standard GB/T2406-1993 "Plastics-Determination of flammability by oxygen index".

Fire rating UL94 test: the samples prepared in examples 1-19 and comparative examples 1-5 were tested according to a test method for the fire rating in UL94-2009.

Tensile strength test: the samples prepared in examples 1-19 and comparative examples 1-5 were tested according to the test condition for moulding and extrusion plastics in part 2 of GB/T1040.2-2006 "Plastics-Determination of tensile properties".

TABLE 4 test data table of flame retardancy of the samples

| Test items Examples | Oxygen Index (%) | Fire Rating UL-94 | Tensile Strength (MPa) |
|---|---|---|---|
| Example 1 | 38 | V-0 | 50 |
| Example 2 | 37 | V-0 | 48 |
| Example 3 | 38 | V-0 | 48 |
| Example 4 | 38 | V-0 | 49 |
| Example 5 | 39 | V-0 | 47 |
| Example 6 | 37 | V-0 | 47 |
| Example 7 | 38 | V-0 | 48 |
| Example 8 | 36 | V-0 | 49 |
| Example 9 | 35 | V-0 | 46 |
| Example 10 | 34 | V-0 | 47 |
| Example 11 | 35 | V-0 | 46 |
| Example 12 | 36 | V-0 | 48 |
| Example 13 | 34 | V-0 | 49 |
| Example 14 | 33 | V-0 | 48 |
| Example 15 | 33 | V-0 | 47 |
| Example 16 | 35 | V-0 | 47 |
| Example 17 | 34 | V-0 | 48 |
| Example 18 | 35 | V-0 | 48 |

TABLE 4-continued test data table of flame retardancy of the samples

| Test items Examples | Oxygen Index (%) | Fire Rating UL-94 | Tensile Strength (MPa) |
|---|---|---|---|
| Example 19 | 33 | V-0 | 46 |
| Comparative example 1 | 20 | V-2 | 37 |
| Comparative example 2 | 23 | V-2 | 35 |
| Comparative example 3 | 30 | V-0 | 38 |
| Comparative example 4 | 28 | V-0 | 39 |
| Comparative example 5 | 26 | V-0 | 40 |

From the test data of each sample in table 4, in combination with the test data of examples 1-4 and comparative examples 1-2, it can be seen that, after the end capping reaction of the brominated flame retardants containing the first active functional group and olefin monomers containing the second active functional group, the brominated flame retardants are bonded to a polystyrene molecular chain by co-polymerizing with the styrene monomer, and the flame retardancy of the obtained flame retardant polystyrene is more excellent than the flame retardant polystyrene obtained by directly melting and extruding the brominated flame retardants containing the first active functional group with the polystyrene. In addition, whether preparing the polystyrene resin with low content of the brominated flame retardant directly, or preparing the flame retardant polystyrene masterbatch with high content of the brominated flame retardant first and then diluting it to the flame retardant polystyrene with low content of the brominated flame retardant, the obtained flame retardant polystyrene has excellent flame retardancy. Moreover, the tensile strengths of the samples in examples 1-19 are all good. Therefore, it is demonstrated that the preparation method in the present application has little effect on the tensile strength of the obtained flame retardant polystyrene.

It can be seen from the test data of examples 1-4 and comparative example 3 that, the dispersion uniformity of the brominated flame retardant containing the first active functional group after end capping reaction is better than that of the brominated flame retardant containing the first active functional group directly dispersed in the styrene monomer, which is helpful to improve the flame retardancy of the obtained flame retardant polystyrene.

The specific examples are only an explanation to the present application, but not a limitation to the present application. Those skilled in the art can make various modifications to the examples without creative contributions as required after reading this specification, but they are protected by the patent law as long as they are within the scope of the claims of the application.

What is claimed is:

1. A preparation method for a flame retardant polystyrene, comprising the following steps:

step 1: performing an end capping reaction by mixing a styrene monomer, a brominated flame retardant containing a first active functional group, and an olefin monomer containing a second active functional group; and after the brominated flame retardant containing the first active functional group is dissolved, heating to 90° C.-140° C. while stirring to obtain a mixture containing the brominated flame retardant introduced with a double bond at an end;

step 2: performing a prepolymerization by adding an initiator to the mixture obtained in step 1 to obtain a prepolymer; and step 3: performing a copolymerization of the prepolymer to obtain the flame retardant polystyrene.

2. The preparation method for the flame retardant polystyrene according to claim 1, wherein a pair of the brominated flame retardant containing the first active functional group and the olefin monomer containing the second active functional group is at least one pair selected from the group consisting of tetrabromobisphenol A bis(2-hydroxyethyl) ether and maleic anhydride, 2,4,6-tribromoaniline and maleic anhydride, 2,4,6-tribromobenzoic acid and glycidyl methacrylate, and tetrabromophthalic anhydride and methacrylic acid.

3. The preparation method for the flame retardant polystyrene according to claim 1, wherein a mass ratio of the brominated flame retardant containing the first active functional group to the olefin monomer containing the second active functional group is (2-4):1.

4. The preparation method for the flame retardant polystyrene according to claim 1, wherein the end capping reaction in step 1 is performed for 0.5 h-1.5 h.

5. The preparation method for the flame retardant polystyrene according to claim 1, wherein the initiator is a composite initiator comprising an azo initiator and a peroxide initiator in a mass ratio of 3:(5-8).

6. The preparation method for the flame retardant polystyrene according to claim 5, wherein the azo initiator is at least one selected from the group consisting of 2,2'-azobis (2-methylpropionitrile), dimethyl 2,2'-azobis(2-methylpropionate), and 2,2'-azobis-(2,4-dimethylvaleronitrile).

7. The preparation method for the flame retardant polystyrene according to claim 5, wherein the peroxide initiator is one or more selected from the group consisting of hydrogen peroxide, ammonium persulphate, potassium persulphate, benzoyl peroxide, tert-butyl peroxybenzoate, methyl ethyl ketone peroxide, dicumyl peroxide, lauroyl peroxide, di-tert-butyl peroxide, tert-butyl hydroperoxide and 1,4-bis (tert-butyl peroxy isopropyl) benzene.

8. The preparation method for the flame retardant polystyrene according to claim 1, wherein step 1 further comprises, adding a flame retardant synergist when mixing the styrene monomer, the brominated flame retardant containing the first active functional group, and the olefin monomer containing the second active functional group, wherein the flame retardant synergist is diantimony trioxide.

9. The preparation method for the flame retardant polystyrene according to claim 8, wherein the brominated flame retardant containing the first active functional group accounts for 0.1%-40% by mass of a total mass of the styrene monomer, the brominated flame retardant containing the first active functional group, the olefin monomer containing the second active functional group, and the flame retardant synergist.

* * * * *